United States Patent Office 3,792,099
Patented Feb. 12, 1974

3,792,099
BRANCHED POLYPHENYLENES
Chen-Shen Wang, Naperville, and Arnold N. Wennerberg, Chicago, Ill., assignors to Standard Oil Company, Chicago, Ill.
Continuation-in-part of abandoned application Ser. No. 92,832, Nov. 25, 1970. This application July 31, 1972, Ser. No. 274,586
Int. Cl. C07c 15/12
U.S. Cl. 260—668 R                    22 Claims

ABSTRACT OF THE DISCLOSURE

Polyphenylenes which have a substantial degree of branching and double bonding through the meta position are disclosed. These polyphenylenes possess increased solubility and are free from chlorine and similar impurities. They possess a high degree of thermal stability and are fusible. The polyphenylenes disclosed are useful in ablative materials and other polymer applications requiring high thermal stability.

CROSS-REFERENCE

Figure 1:
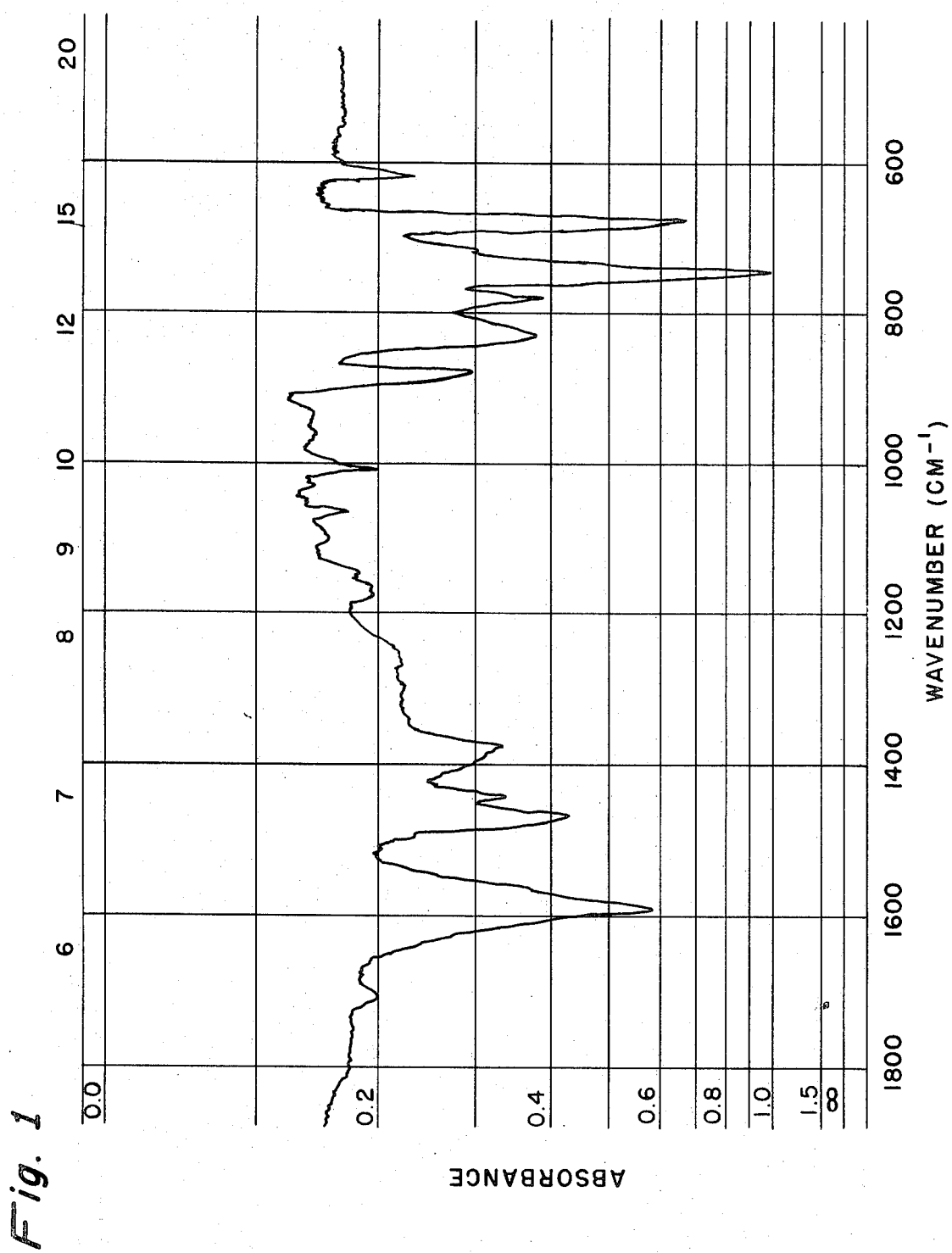

This application is a continuation-in-part of Ser. No. 92,832, filed Nov. 25, 1970 on behalf of the same inventors, and now abandoned.

BACKGROUND OF THE INVENTION

Over the past decade or so, much effort has been expended on the synthesis and evaluation of polymers for high temperature use. The goal has been to extend the useful upper temperature limits at which polymers maintain their desirable properties to at least 300° C. and preferably to 500° C. or above. Polymers which possess these properties are usually highly aromatic structures, often with heterocyclic units, high melting, sometimes infusible, and usually with low solubility. The infusible and insoluble nature of these polymers makes their fabrication very difficult and consequently limits their usefulness.

The high degree of thermal stability associated with polyphenylenes has been known for some time. Polyphenylenes have generally been produced by techniques such as acid catalyzed oxidative coupling of the benzene ring in various aromatic compounds. The polyphenylenes produced by these processes possess some degree of high temperature thermal stability, but they are generally linear polymers which are relatively insoluble and infusible. In addition, these polymers generally contain chlorine and other impurities which are usually derived from the catalyst and/or monomers used to prepare them and which are many times incorporated onto the aromatic rings. The presence of these impurities tends to substantially interfere with the thermal properties of the polymer, thus reducing its usefulness.

Polyphenylenes are known which possess varying degrees of solubility. However, these polyphenylenes still generaly contain impurities such as sulphur and chlorine which are usually incorporated into the polymer chain by reactions which compete with the polymerization. In addition to adversely affecting the thermal properties, these impurities also tend to create difficulties such as the foaming which occurs when the polymer is heat treated to induce cross-linking and the like. These polyphenylenes also contain a low degree of branching, that is they are still relatively linear polymers which contain long linear segments. This results in the solubility being lost when the polymers are heat treated prior to subsequent processing. These prior art polyphenylenes also generally contain fused rings.

In contrast to the prior art polyphenylenes, we have discovered a novel branched polyphenylene polymer which contains branching to an extent heretofore unknown in the art. In addition to the high degree of branching, this polymer contains no long linear segments and contains a substantial degree of double bonding through the meta position rather than through the para position. As a result of these characteristics, this novel branched polyphenylene demonstrates an increased solubility in aromatic solvents when compared to the prior art compositions in the same solvent and at roughly comparable molecular weights.

The polymers of this invention are also free from chlorine and other impurities which are contained in the polymers known heretofore in the art. This polymer also possesses a greater degree of thermal stability than known heretofore in the art for polyphenylene-type polymers. This polymer is also free from fused rings, is fusible, and can be thermally cross-linked without the difficulties encountered with the prior art polyphenylenes. This polymer is also relatively inexpensive as it can be made from rather cheap monomers such as biphenyl, toluene, and benzene by a novel dehydrogenative coupling process.

SUMMARY OF THE INVENTION

This invention relates to branched polyphenylenes which comprise alkyl-substituted or alkyl-unsubstituted benzene ring structures or a mixture thereof. The amount of benzene ring structures in this novel polyphenylene which are bonded to three or more other benzene ring structures is from about 15 to about 25 percent by weight. The amount of benzene ring structures bonded to two other benzene ring structures through the para, meta, or ortho positions is from about 45 to about 65 percent by weight with the amount of benzene ring structures bonded through the meta position being about 15 to about 30 percent by weight. The remaining benzene ring structures are bonded to only one other benzene ring structure.

In a preferred aspect of this invention, the branched polyphenylene consists of alkyl-unsubstituted benzene ring structures within the above-described weight percent range.

The novel branched polyphenylene polymers of this invention possess a considerably enhanced solubility when compared to the prior art compositions and possess outstanding thermal properties. Among the applications for this polymer are use in ablative materials and carbon fiber composites.

DESCRIPTION OF THE INVENTION

The novel branched polyphenylenes of this invention exhibit an infrared absorption spectra similar to that shown in FIG. 1. The spectra of FIG. 1 was obtained from a KBr pellet of an alkyl-unsubstituted branched polyphenylene on a Perkin-Elmer Model 180 infrared spectrometer using standard techniques. The exact spectra shown in FIG. 1 is for the branched polyphenylene described in Example III. The most important spectral absorption bands for this polymer are located between 700 cm.$^{-1}$ and 1000 cm.$^{-1}$. These spectral bands are characteristic of the benzene ring structures described below in Table I. The presence of these spectral bands indicates that the polymer chains in our polyphenylene are highly branched and that a substantial amount of the double bonding present occurs through the meta positions of the component benzene ring structures.

The infrared absorption spectra shown in FIG. 1 also indicates the presence of other spectral bands. In particular, these bands are located at about 610 cm.$^{-1}$, 690 cm.$^{-1}$, between 1450 and 1500 cm.$^{-1}$, and between 1550 and 1600 cm.$^{-1}$.

The carbon hydrogen ratio of our polymer is generally between about 1.50 and 1.60. Ultra-violet spectral analysis shows no band at $3.16 \times 10^4$ cm.$^{-1}$. The absence of a band at that point indicates the absence of lengthy linear chains of benzene rings. Nuclear magnetic resonance indicates the presence of meta-linked phenyl units. Pyrolytic gas chromatography at 900° C. and 1200° C. resulted in the detection of large amounts of m- and p-terphenyls. This indicates that the polymer is composed from simple phenylene units rather than from fused rings.

In addition to the above-described analytical data, linear infrared absorption spectras were obtained between 600 cm.$^{-1}$ and 1000 cm.$^{-1}$ for a number of our branched polyphenylenes. These spectras were correlated with the linear absorption spectra for the following low molecular weight reference compounds: m-terphenyl, m-quaterphenyl, m-quinquiphenyl, o-terphenyl, and p-terphenyl. The purpose of this linear absorption spectral analysis was to determine the structure of our polyphenylenes, in particular, the degree of branching and the amounts of the various types of benzenes ring to benzene ring bonds present.

TABLE I

| Region | Absorption frequency, cm.$^{-1}$ | Generally characteristic of— |
|---|---|---|
| PH | 726–776 | 5 adjacent hydrogens, mono-substituted benzene ring structure, i.e. |
| M | 778–806 | 3 adjacent hydrogens, meta-disubstituted benzene ring structure, i.e. |
| P | 806–854 | 2 adjacent hydrogens, para-disubstituted benzene ring structure, i.e. |
| I | 854–930 | Isolated hydrogen; meta-disubstituted benzene ring structure, i.e. meta-trisubstituted benzene ring structure, i.e. and higher substituted benzene ring structures, i.e. |

To reduce the possibility of error, controlled preperation and operating conditions were used to prepare and scan the KBr pellets used in this analysis. Particular care was taken as to the particle size of the samples and the pressing conditions used to form the KBr pellets as lack of control over these variables can effect the resulting spectrums. To minimize the effect of the particle size, all of the samples were ground with KBr for the same period of time. The amount of the samples used to obtain the spectrums were adjusted to obtain comparable and easily measurable intensities.

Figure 2:
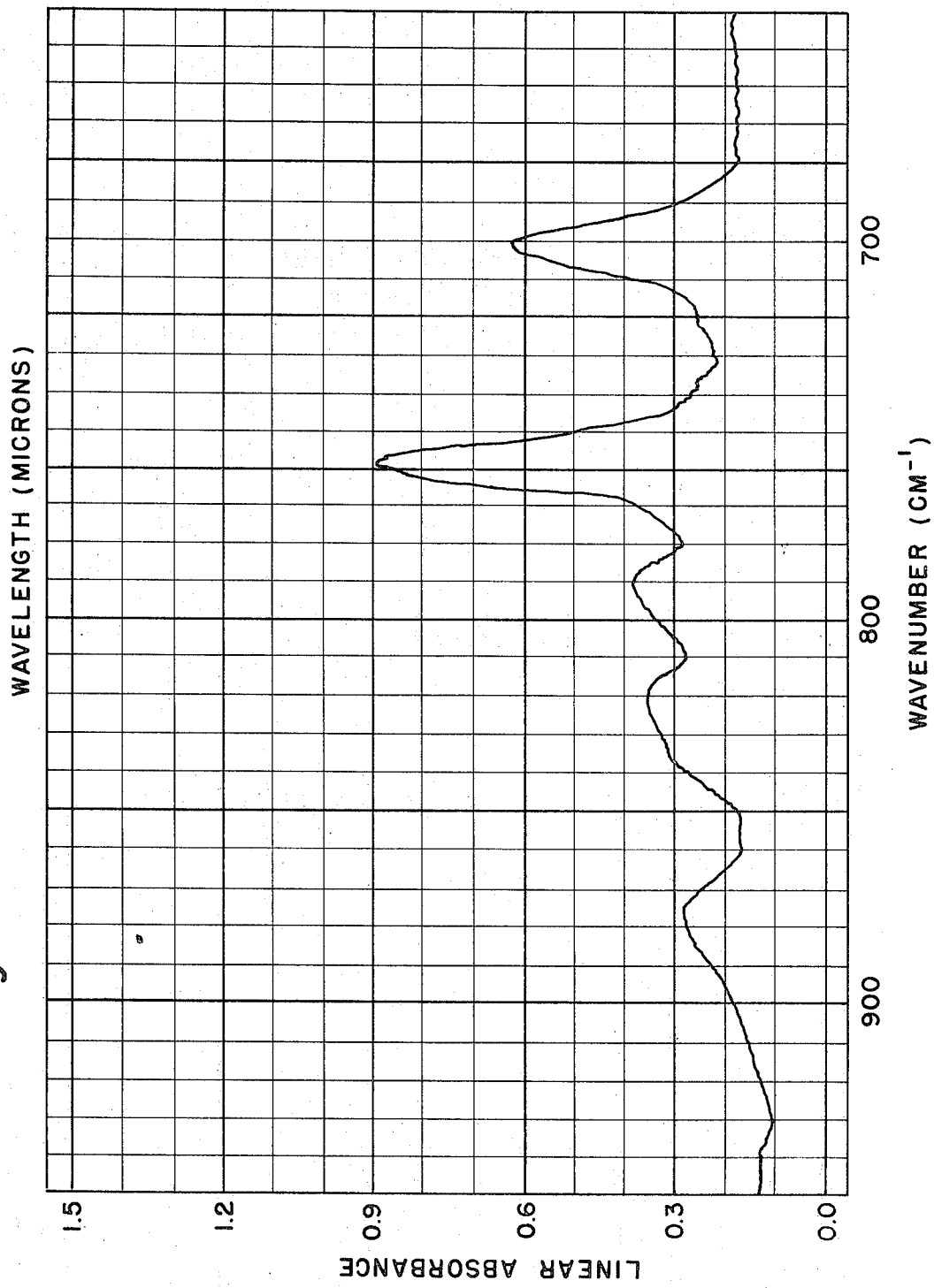

FIG. 2 is a typical linear infrared absorption spectra for an alkyl-unsubstituted branched polyphenylene within the scope of this invention. The exact spectrum shown in FIG. 2 was obtained from the branched polyphenylene described in Example III.

After the linear absorbance spectra were obtained, the integrated peak areas within the spectral band regions identified in Table I were measured with a planimeter. The integrated peak areas so obtained are one means of characterizing our polymer. In general, from about 13 to 18% of the total integrated peak area obtained within the frequency range 726–930 cm.$^{-1}$ falls within the frequency range 854–930 cm.$^{-1}$. The frequency range 806–854 cm.$^{-1}$ generally accounts for about 20 to 26% of the total integrated peak area. The frequency range 778–806 cm.$^{-1}$ accounts for about 13 to 20% of the total integrated peak area within the frequency range 726–930 cm.$^{-1}$.

Our polymer is preferably characterized by the amount of the various types of benzene ring structures present in the polymer chains. This is determined according to the following equation:

$$c = \frac{A}{ba^*}$$

In this equation, A is the planimeter reading for the absorption frequency ranges indicated in Table I corrected by a constant factor relating to the planimeter used. A is in units of cm.$^{-1}$. The values of the A for the region between 854 and 930 cm.$^{-1}$ are corrected for presence of meta-disubstituted benzene ring structures by applying a correction factor obtained from the value of A for the region 778–806 cm.$^{-1}$. b Is the thickness of the KBr pellet in units of cm. $a^*$ is the integrated absorptivity in units of g.$^{-1}$ cm.$^{-2}$. The values for $a^*$ are obtained from the integrated peak areas of the reference compounds determined under essentially the same operating conditions used for obtaining the spectra for our polyphenylenes. c Is the concentration, in grams per liter, of any of the characteristic benzene ring structures indicated in Table I. The amount of the various types of benzene ring structures present in the polymer chain is determined by dividing the measured concentration obtained from a particular frequency range by the sum of the concentrations obtained from all of the frequency ranges described in Table I.

Further details regarding the procedure used for obtaining the linear absorbance spectra and regarding the calculations resulting from those spectra can be found in Example III.

Based upon the above linear absorption spectral analysis and the other analytical data, the structure of our novel branched polyphenylene can be described as follows: The polymer chains in our novel branched polyphenylene contain mono, di, and trisubstituted benzene ring structures; that is, the benzene ring structures in the polymer chain are attached to one, two, or three other benzene ring structures. In addition, a small amount of tetra or higher substituted benzene ring structures may be present in the polymer chain, although factors such as steric hindrance would indicate that the amount of such structures present is minor. The amount of benzene ring structures in the polymer chain which are at least trisubstituted, that is, bonded to three or more other benzene ring structures, is from about 15 to about 25 percent by weight. The amount of benzene ring structures which are disubstituted, bonded to two other benzene ring structures through either the para, meta, or ortho positions, is from about 45 to about 65 percent by weight. The amount of benzene ring structures which are meta-disubstituted, bonded through the meta position to two other benzene ring structures, is from about 15 to about 30 percent by weight. The remaining benzene ring structures are bonded to only one other benzene ring structure. In addition, the analytical data indicates the polymer chains are largely free from linear segments of more than three benzene ring structures in length.

The analysis also indicates that the preferred amount of benzene ring structures in the polymer chain which are at least trisubstituted is from about 17 to about 22 percent by weight. The preferred amount of benzene ring structures which are disubstituted is from about 50 to about 60 percent. And the preferred amount of benzene ring structures which are meta-disubstituted is from about 19 to about 28 percent by weight.

The structure of a typical branched polyphenylene prepared from biphenyl, and within the scope of this invention, can be represented as follows:

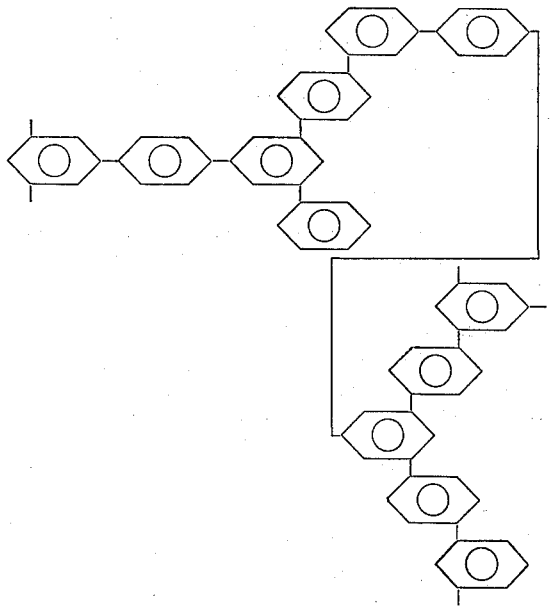

The benzene ring structures which comprise the chains of our branched polyphenylene may contain alkyl substitutions or they may be alkyl-unsubstituted. If the polymer contains alkyl-substituted benzene ring structures, the alkyl substituents usually contain from 1 to 3 groups which are selected from the alkyl groups containing from 1 to 3 carbon atoms. Preferably, alkyl substituents are limited to from one to two methyl groups.

Also within the scope of this invention are branched polyphenylenes which consist of a mixture of alkyl-unsubstituted benzene ring structures and alkyl-substituted benzene ring structures. Preferably, the alkyl-substituted benzene ring structures are only a minor weight proportion of the total amount of benzene ring structures present. However, in order to obtain the optimum thermal properties, the benzene ring structures are generally free from or substantially free from alkyl substitutions; that is, the benzene ring structures are alkyl-unsubstituted.

The inherent viscosity of our branched polyphenylenes can vary from about 0.025 or less to more than 0.17 when measured in trichlorobenzene at 135° C. This roughly corresponds to a number average molecular weight range of from 1000 or less to greater than 10,000 when measured by vapor pressure osmometric methods. For many end uses, inherent viscosities in excess of about 0.04 are preferred, although polymers with inherent viscosities below 0.04 are useful for some purposes. More preferably, branched polyphenylenes with an inherent viscosity of at least 0.08 are preferred. This corresponds to a number average molecular weight of about 4000. A highly preferred inherent viscosity range for this branched polyphenylene is from about 0.11 to about 0.17. This range corresponds to a number average molecular weight of about 6000 to 10,000. This inherent viscosity range is preferred because branched polyphenylenes within this range are most useful for subsequent fabrication into ablative materials and similar articles.

Our branched polyphenylene is free from the incorporation of chlorine and sulphur impurities into the polymer chain. This is a particularly important advantage as the absence of these impurities leads to the development of the high thermal properties which this polymer possesses.

The highly branched polyphenylenes of this invention are compositions which retain a high degree of thermal stability while possessing solubility in various aromatic solvents. The polyphenylenes of this invention demonstrate an increased solubility in aromatic solvents when compared to the prior art compositions in the same solvent and at roughly comparable molecular weights. Our branched polyphenylenes can be dissolved to different extents, depending upon their inherent viscosity (molecular weight), in solvents such as benzene, naphthalene, bromobenzene, chlorobenzene, trichlorobenzene, and the like. As the inherent viscosity of the polyphenylenes increases, the halogenated aromatics are the preferred solvents. Polar compounds such as tetrahydrofuran and dimethylformamide may also be used as solvents. In general, our branched polyphenylenes are soluble up to an inherent viscosity of about 0.17. The increased solubility is particularly advantageous as it leads to a much greater ease of fabrication than is generally available in the polyphenylene art.

The branched polyphenylenes of this invention possess a very high degree of thermal stability. Our polyphenylenes are stable up to about 600° C. in air when tested by thermal gravimetric analysis. Thermal gravimetric analysis of our polymer in nitrogen shows that it retains about 80% of its original weight up to about 1000° C. The unretained 20% is attributable to weight loss caused by the volatility of some low molecular weight components and is not attributable to weight loss from decomposition.

Our novel branched polyphenylene is also fusible and it can be thermally cross-linked.

Because of the above-mentioned ease of fabrication, high temperature properties, and other properties, the highly branched polyphenylenes of this invention are useful in many areas. Among the applications for this polymer are use in ablative materials and in carbon fiber composites. Our polymers can also be used as organic fillers in other high temperature resistant polymers, such as the polyamide-imide compositions. These polymers also find applications as grease thickeners.

The novel branched polyphenylenes described herein are readily prepared by a one-step process starting with partially hydrogenated aromatics, by a two-step process starting with aromatics or a mixture of aromatics and partially hydrogenated aromatics, or by a combination of these processes. This process is described in copending applications Ser. No. 858,867, filed Sept. 17, 1969, on behalf of A. N. Wennerberg, and now abandoned and in Ser. No. 264,846, a continuation-in-part of said Ser. No. 858,867, filed on behalf of the same inventor. Improved versions of this process are described in Ser. No. 169,367 and Ser. No. 169,429, both filed Aug. 5, 1971 on behalf of C. S. Wang, both of which are now abandoned.

The one-step process described therein consists of the catalytic dehydrogenative coupling of the partially hydrogenated aromatics in the presence of hydrogen at elevated temperatures and pressures. The two-step process consists of a controlled partial hydrogenation as well as the dehydrogenative coupling. The two-step process begins with either aromatic compounds or a mixture of aromatic compounds and partially hydrogenated aromatic compounds. Preferably, a mixture of aromatics with from about 1% to 10% of partially hydrogenated aromatics is employed. This two-step process of controlled hydrogenation and dehydrogenative coupling can be run as two separate steps or can be combined into one reaction during which the controlled hydrogenation and the dehydrogenative coupling can be occurring simultaneously.

Suitable starting materials or monomers for use in the practice of this invention are any of the aromatics containing a benzene ring structure or any of the partially hydrogenated aromatics containing a partially hydrogenated benzene ring structure. The partially hydrogenated benzene ring structure. The partially hydrogenated benzene ring structure. The partially hydrogenated aromatic compounds must be hydrogenated to at least their dihydro derivative but must not be fully hydrogenated. The monomers must have at least two unsubstituted positions for the subsequent coupling reactions. By unsubstituted, I mean that these positions contain no substituents other than hydrogen atoms. However, the above aromatic compounds and partially hydrogenated aromatic compounds may contain substituents such as from 1 to 3 alkyl groups containing from 1 to 3 carbon atoms.

Specific examples of aromatic compounds which can be polymerized by the process of this invention are benzene, biphenyl, toluene, xylene, ethylbenzene, and the like. Examples of partially hydrogenated aromatic compounds which can be utilized in the process of this invention are the hydrophenyls such as cyclohexadiene and cyclohexene, the hydrobiphenyls such as phenyl cyclohexadiene, phenyl cyclohexene, and phenyl cyclohexane, the hydrotoluenes, and hydroxylenes, and the like.

While either the aromatic compounds or the partially hydrogenated aromatic compounds may be reacted alone, a mixture of aromatics and partially hydrogenated aromatics may be employed. In a preferred process when an aromatic compound is employed as a starting material, it may be mixed with from about 1% to 10%, more preferably 1% to 5%, of a partially hydrogenated aromatic.

The catalyst systems useful to prepare the branched polyphenylene of this invention are such as silica, alumina, or preferably, mixtures of silica and alumina. Also useful are the noble metal catalysts supported on the above, alkalized chromium trioxide, alkalized ferric oxide, nickel and molybdenum oxides, sodium, calcium, cobalt, or molybdenum oxides or mixtures thereof, and the like, all supported on alumina, silica, or alumina-silica mixtures.

A preferred catalyst is $Al_2O_3$-$SiO_2$ alone or as a support for other active ingredients incorporated into the catalyst system. These other active ingredients are generally oxides of metals listed in the Mendeleyev Periodic Table in Groups V-B, VI-B, VII-B, VIII-B periods 3 and 4, III-A and IV-A periods 2 and 3, and combinations thereof. Most preferably such additional active ingredients are alkalized chromium trioxide, ferric oxide, calcium oxide, cobalt oxide and molybdenum oxide alone or in combination. When used in combination with such other active ingredients, the $Al_2O_3$-$SiO_2$ content is preferably about at least 90% by weight and most preferably about 95 to 98 weight percent as based on the total weight of the catalyst combination.

Whatever catalyst is used, the amount necessary will vary with the materials being polymerized and the reaction conditions in terms of time, temperature and pressure. If an insufficient amount of catalyst is used for a particular reaction system under any set of reaction conditions, reaction rates will be decreased. If excess catalyst is used, conversion will be decreased and coke formation will occur. For most reaction systems at least about 1% by weight catalyst, based on the monomer weight, is used with about 2% to about 4% by weight being preferred.

Optimum time, pressure, and temperature conditions for this process cannot be given since such will depend upon the nature of the particular compounds being polymerized as well as the particular catalyst system being employed. However, we have ascertained certain advantageous reaction conditions.

In a one-step process starting with the partially hydrogenated aromatics, temperatures within the range of 750° F. to about 1300° F., preferably about 900° F. to 1200° F., and pressures within the range of 600 p.s.i.g. to 2000 p.s.i.g., preferably 1000 p.s.i.g. to 1700 p.s.i.g., more preferably 1200 p.s.i.g. to 1600 p.s.i.g., have been found useful.

In a two-step process starting with the aromatics or a mixture of aromatics and partially hydrogenated aromatics, we have found that temperatures within the range of 400° F. to 1200° F., preferably 750° F. to 1100° F., and pressures within the range of 500 p.s.i.g. to 2000 p.s.i.g., preferably 800 p.s.ig. to 1500 p.s.i.g., are useful in the hydrogenation step. In the dehydrogenation step, we have found temperatures within the range of 800° F. to 1300° F., preferably 900° F. to 1200° F., and pressures within the range of 600 p.s.i.g. to 2000 p.s.i.g., preferably 1000 p.s.i.g. to 1700 p.s.i.g., to be particularly useful.

Both the controlled hydrogenation and the dehydrogenative coupling steps need to be conducted in the presence of hydrogen. The hydrogen partial pressure should be at least about 10% of the total pressure at reaction conditions. Preferably the hydrogen partial pressure is from about 30% to 60% of the total reaction pressure at reaction conditions. More preferable, the partial hydrogen pressure is about half of the total pressure. In general, if the process is carried out in an autoclave reactor, the initial charge of hydrogen gas at room temperature should be at least about 50 p.s.i.g. and preferably between about 200 p.s.i.g. and 400 p.s.i.g.

While not necessary, it is desirable to conduct the polymerization reaction of this invention in a liquid phase using as a solvent a hydrocarbon which tends to remain relatively inert under the conditions of reaction. The existence of the liquid phase appears to aid in the prevention of polymer carbonization though if carbonization is not present to an undesirable extent, a vapor phase reaction is feasible. Suitable solvent materials are any hydrocarbons less reactive under selected reaction conditions than the compounds undergoing polymerization. For example, terphenyl may be used as a solvent for the reaction of biphenyl. However, such solvents are typically saturated hydrocarbons having ten or more carbon atoms. Examples are decane, hendecane, hexadecane and the like.

In a preferred method of operation, the steps of controlled hydrogenation and dehydrogenative coupling can be combined into one process. In this process, aromatic compounds or a mixture of aromatics with partially hydrogenated aromatics are charged to a sealed, stirred reactor along with a suitable catalyst and sufficient hydrogen gas. The reactor is then heated to an elevated temperature, generally under constant heat input conditions. In the early stages of the reaction, after the initial heat-up period, the temperature tends to increase at a very gradual rate. After a period of time, generally a number of hours, the temperature begins to increase at a more rapid rate. After a further time, the temperature generally reaches a peak and begins to decrease somewhat. After another interval of time, the temperature tends to level off at a value which is measurably lower than the peak temperature. Thus, the reaction temperature increases rapidly during initial heat up, basically levels off for a time, and then goes through a noticeable temperature increase followed by a noticeable decrease in temperature. Finally the temperature levels off again.

While not wishing to be bound by any theory, the following is offered as an explanation of this observed behavior. The partial hydrogenation of the starting materials in the process is exothermic. The dehydrogenative coupling of the partially hydrogenated aromatics is endothermic. After the initial heat up period, during the period of gradual temperature increase, it is believed that some hydrogenation is occurring along with possibly a small amount of dehydrogenative coupling. During the period at which the temperature is found to be increasing more rapidly, the system is believed to have begun to react in substantial proportion in terms of the partial hydrogenation. It is also believed that some dehydrogenative coupling is occurring during this time. After the temperature has reached its peak point, the rate of dehydrogenative coupling is believed to be significantly greater than the rate of partial hydrogenation. When the temperature levels off again after having reached a peak temperature, the dehydrogenative coupling is considered to be complete for all practical purposes.

It should be kept in mind that the above-described temperature behavior does not always occur. With some monomers and catalyst systems, the decreasing temperature stage is not observed. However, soluble polyphenylenes are still being produced.

In this preferred process, the temperature reached after initial heat up is generally within the range of 400° F. to about 1100° F., preferably about 800° F. to 1000° F. The peak reaction temperature is generally within the range of 900° F. to about 1300° F., preferably 1000° F. to 1200° F. The pressures reached after the initial heat up are generally within the range of 600 p.s.i.g. to 1200 p.s.i.g., although higher pressures are possible. The maximum pressure attained is generally within the range of 1000 p.s.i.g. to 2000 p.s.i.g., preferably 1200 p.s.i.g. to 1700 p.s.i.g. The partial hydrogen pressure is as described above.

The process for producing the branched polyphenylenes of this invention is more fully described in the above-described copending application Ser. No. 858,867 and in its continuation-in-part application Ser. No. 264,846.

In describing the structure of our branched polyphenylene, the terminology double bonding through the meta position refers to the bonding of a benzene ring structure to two other benzene ring structures through the meta positions of the benzene ring structure.

Example I

The process for producing the branched polyphenylenes of this invention from biphenyl in a two-stage process can be carried out as follows.

Into a 500 ml. rocking bomb reactor there was charged 10.0 g. of a catalyst having the composition

$10CaO \cdot CoO \cdot MoO_3 \cdot 8Al_2O_3$ with 60 g. (0.39 mol) biphenyl and hydrogen sufficient to produce a partial pressure at 750° F. in the range of 800 to 1000 p.s.i.g. The catalyst had been prepared from a commercially available cobalt-molybdate-alumina reforming catalyst containing 2% cobalt oxide, 9% molybdenum oxide and 89% alumina. This was crushed and impregnated with a solution of calcium hydroxide containing sufficient calcium hydroxide to produce a 1:1 mole ratio of calcium oxide to the cobalt-molybdate-alumina, after calcination. A hydrogenation reaction for production of intermediate hydrobiphenyls was carried out for 3 hours at a temperature in the range of 650° F. to 750° F. under a total pressure of 1500 p.s.i.g., representing a hydrogen partial pressure of 800 to 1000 p.s.i.g. Following such reaction, the system was cooled to room temperautre and unreacted hydrogen was voided to reduce reactor pressure to 50 p.s.i.g.

A dehydrogenation reaction reuslting in dehydrogenative coupling was next performed over a period of 6 hours at a temperature of 1000° F. and a pressure of 750 to 800 p.s.i.g. During this reaction, hydrogen was vented at intervals to maintain the reactor pressure at the 750 to 800 p.s.i.g. level and remove hydrogen produced by the dehydrogenation reaction. Following the reaction, the reactor was cooled to room temperature and all hydrogen was vented.

The total crude reaction product amounted to 69 g. of material which was viscous liquid at 80° C. This was transferred to a 500 ml. beaker and dissolved in 250 ml. of benzene. Some residual material was removed from the reactor by benzene washing and the total crude product solution was filtered to separate solid catalyst. Following filtration, the clear filtrate was flashed for removal of 210 ml. of benzene yielding a viscous solution at 25° C. To the solution there was added 500 ml. of n-pentane. The pentane solution was stirred for 3 hours following which an insoluble fraction was separated by filtration and washed with 350 ml. portions of pentane. The filtrate and washes were combined and the pentane was removed by distillation to yield 49.3 g. of a pentane-soluble product. The pentane-insoluble product amounted to 12.8 g. of a solid which was determined by infrared analysis and gel permeation chromatography to contain terphenyl, quatraphenyl, pentaphenyl and hexaphenyl in addition to the higher molecular weight branched phenylenes. The conversion to polyphenylenes of biphenyl was approximately 21.4%.

Example II

This example demonstrates the preparation of a polyarylene from a mixture of an aromatic, biphenyl, and a partially hydrogenated aromatic, phenylcyclohexane.

Into a stirred 300 ml. autoclave there was charged 2.0 g. of catalyst having the composition

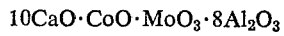

$10CaO \cdot CoO \cdot MoO_3 \cdot 8Al_2O_3$ 100 g. (0.65 mol) of biphenyl, 4.8 g. (0.03 mol) of phenylcyclohexane (a hydrobiphenyl) and hydrogen sufficient to produce a pressure of 300 p.s.i.g. at the reaction temperature. The autoclave was maintained at a temperature within the range of 1000 to 1060° F. for a period of about 12 hours under a total pressure of 600 to 1000 p.s.i.g. with a hydrogen partial pressure of 300 p.s.i.g. The autoclave contents were cooled and worked up according to the general procedure in Example I, following which there was obtained a pentane-insoluble polyphenylene having an inherent viscosity of about 0.025 which was completely soluble in benzene.

Example III

Into a stirred 300 ml. autoclave there was charged 2.0 g. of a catalyst, $Na_2O \cdot MoO_3 \cdot SiO_2 \cdot Al_2O_3$, 97.5 g. of biphenyl, 2.5 g. of phenylcyclohexane, and 300 p.s.i.g. of hydrogen. Constant heat input conditions were applied. The maximum temperature reached during a five-hour reaction period was 1090° F. The final temperature was 960° F. and the maximum pressure reached was 1580 p.s.i.g.

The total crude product was transferred to a 1000 ml. beaker and dissolved in 500 ml. of 1,2,4-trichlorobenzene with the help of heat and stirring. After filtration to remove the catalyst, the filtrate was transfered into a 4000 ml. flask and the polymer was precipitated out with n-pentane. The polymer was filtered and washed with n-pentane. The polymer was then dried in a vacuum oven at 100° C. for 24 hours. The conversion to polymer soluble in trichlorobenzene was 45.5%. The branched polyphenylene product had an inherent viscosity of 0.14 when measured in trichlorobenzene at 135° C. using a Cannon-Ubbelohde viscometer. This corresponds to a number average molecular weight of about 8000. FIG. 1 is the infrared absorption spectra for the trichlorobenzene-soluble, branched polyphenylene polymer of this example as obtained on a Perkin-Elmer Model 180 spectrometer from a KBr pellet.

The linear absorbance spectra shown in FIG. 2, and used for determing the amounts of the various benzene ring structures present, was obtained as follows: 7 mg. of the polyphenylene and 0.8 g. of dry KBr were accurately weighed and then placed into a clean grinder vial along with a steel grinder ball. The vial was placed on a dental grinder and the sample was ground for 10 min. 200 mg. of the above mixture and 0.8 g. of dry KBr were accurately weighed and again placed into a clean vial along with a steel grinder ball. This was also ground for 10 min. on the dental grinder. About 0.15 g. of the final dilution was transferred to the KBr die and the die plunger was inserted. The die was attached to a vacuum line to remove entrapped air. The sample was pressed at 20 tons per in.² for 4 minutes. The density of the pressed pellet was 27.278 g./l. The pellet was mounted in the holder of a Perkin-Elmer Model 180 spectrometer and the sample was scanned from 600 cm.⁻¹ to 1000 cm.⁻¹ on linear absorbance paper.

A base line was drawn from 930 cm.⁻¹ to 650 cm.⁻¹. The areas corresponding to the frequency regions indicated in Table II below were measured with a planimeter. The planimeter readings obtained for these frequency readings are also shown in the table. Using a constant factor of 1/10.59 cm.⁻¹, determined from the planimeter used, the planimeter area readings were converted to values of A. These values for A were used to determine the analyzed density of the sample according to the following equation:

$$C = \frac{A}{ab^*}$$

wherein $c$ is in units of g./l., A is the corrected planimeter reading in cm.⁻¹, $b$ is in units of cm. and $a^*$ is in units of g.⁻¹ 1 cm.⁻².

TABLE II

| Frequency region, cm.⁻¹ | Region | Planimeter area | A/b, cm.⁻² | c, g./l. | Weight, percent |
|---|---|---|---|---|---|
| 854–930 | I | 110 | 213.2–144.1¹ | 5.69 | 19.6 |
| 806–854 | P | 155 | 300.4 | 9.02 | 31.0 |
| 778–806 | M | 107 | 207.4 | 6.23 | 21.4 |
| 726–776 | PH | 329 | 637.7 | 8.16 | 28.0 |

¹ The value for A/b for the I frequency region has been corrected for the presence of the M region material, i.e., meta-disubstituted benzene ring structures. The correction factor is equal to one-third of the value of A/b for the region M.

The values for $a^*$ are as indicated in Table III. These values were determined from the linear absorbance spectra of the following reference compounds: m-terphenyl, m-quaterphenyl, m-quinquiphenyl, o-terphenyl, and p-terphenyl. The same conditions as described above were used to prepare the linear absorbance spectra for these compounds. The same planimeter was also used. $a^*$ was obtained from the integrated absorptivity per mole of H by multiplying it by the number of hydrogen atoms present in the characteristic benzene ring structure and dividing it by the molecular weight of the characteristic structure. The characteristic structure for the I region was assumed to be

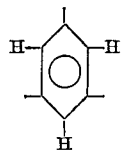

TABLE III

| Region | Absorption frequency, cm.⁻¹ | Characteristic number of H atoms | Integrated absorptivity Per mole of H (mole⁻¹/ 1 cm.⁻¹) | $a^*$, g.⁻¹ 1 cm.⁻² |
|---|---|---|---|---|
| PH | 726–776 | 5 | 1,204.7 | 78.2 |
| M | 778–806 | 3 | 633 | 33.3 |
| P | 806–854 | 2 | 633 | 33.3 |
| I | 854–930 | 3 | 633 | 25.3 |

The sum of the values for $c$ is 29.1 g./l. The weight percent of each of the characteristic structures present was determined by dividing the value of $c$ for each region by the sum of the values for $c$. The percent recovery for the analysis was determined by dividing the sum of the values for $c$ by the known sample density. The percent recovery was 107%.

Example IV

In a manner similar to that described in Example III, there was charged 1.0 g. of a catalyst described in Example I, 97.5 g. of biphenyl, 2.5 g. of phenylcyclohexane, and 14.7 p.s.i.g. of hydrogen. The maximum temperature reached during a thirteen one-quarter hour reaction period was 1050° F. The maximum pressure attained was 1475 p.s.i.g. and the final temperature was 998° F. The conversion to polymer soluble in trichlorobenzene was 29.5%. The inherent viscosity was 0.07 when measured in trichlorobenzene at 135° C.

A linear absorbance spectra was obtained according to the procedure described in Example III. The density of the KBr pellet was 15.3055 g./l. The planimeter integrated peak areas and the weight percents atributable to each of the characteristic structures are shown in Table IV. The percent recovery was 109.5%.

TABLE IV

| Region | Planimeter area | A/b, cm.⁻² | c, g./l. | Weight, percent |
|---|---|---|---|---|
| I | 65 | 121.8–¹ 78.7 | 3.11 | 18.6 |
| P | 96 | 180.0 | 5.40 | 32.2 |
| M | 69 | 129.3 | 3.88 | 23.2 |
| PH | 182 | 341.2 | 4.36 | 26.0 |

¹ Corrected.

Example V

In a manner similar to Example III, 6.4 g. of a catalyst, Na₂O·CoO·MoO₃·SiO₂·Al₂O₃, was charged to the autoclave along with 97.5 g. of biphenyl, 2.5 g. of phenylcyclohexane, and 300 p.s.i.g. of hydrogen. Again, under constant heat input conditions, the maximum temperature attained during the reaction was 1040° F. The maximum pressure was 1650 p.s.i.g. and the final temperature was 933° F. The percent conversion to soluble polyphenylene was 21.7%. The inherent viscosity was 0.124 which corresponds to a number average molecular weight of about 7000.

A KBr pellet with a density of 22.5158 g./l. produced a linear absorbance spectra which had the planimeter areas described in Table V. Again, the equation described in Example III was used to determine the weight percent of the characteristic structure present. The percent recovery for the analysis was 107%.

TABLE V

| Region | Planimeter area | A/b, cm.⁻² | c, g./l. | Weight, percent |
|---|---|---|---|---|
| I | 110 | 177.0–¹115.3 | 4.56 | 18.9 |
| P | 154 | 247.7 | 7.44 | 30.9 |
| M | 115 | 185.0 | 5.56 | 23.1 |
| PH | 318 | 511.6 | 6.54 | 27.2 |

¹ Corrected.

Example VI

In a manner similar to that described in Example III, there was charged 2.0 g. of a catalyst, SiO₂·Al₂O₃, 97.5 g. of biphenyl, 2.5 g. of phenylcyclohexene, and 300 p.s.i.g. of hydrogen at a temperature of 80° F. The maximum temperature attained during a seven-hour reaction period was 1083° F. and the maximum pressure was 1560 p.s.i.g. The final temperature was 977° F. The inherent viscosity of the trichlorobenzene soluble polymer was 0.06 which corresponds to a number average molecular weight of about 3000. The conversion to polyphenylene soluble in trichlorobenzene was 37.6%.

A linear absorbance spectra was obtained in the manner described in Example III. The pellet density was 25.4320 g./l. The planimeter integrated peak areas and other information are given below in Table VI. The percent recovery was 107%.

TABLE VI

| Region | Planimeter area | A/b, cm.⁻² | c, g./l. | Weight, percent |
|---|---|---|---|---|
| I | 118 | 194.1–¹126.6 | 5.00 | 18.4 |
| P | 167 | 274.7 | 8.25 | 30.3 |
| M | 123 | 202.3 | 6.10 | 22.3 |
| PH | 374 | 615.1 | 7.87 | 28.9 |

¹ Corrected.

Example VII

Into a rocking bomb reactor there was charged 2.0 g. of the catalyst described in Example I along with 50 g. of biphenyl and 810 p.s.i.g. of hydrogen. During a two-hour reaction period under constant heat input conditions, a maximum temperature of 850° F. and a maximum pressure of 1330 p.s.i.g. was obtained. The temperature was then raised to 1065° F. at which time the reactor was vented to reduce the pressure to 600 p.s.i.g. The reaction was then allowed to continue for approximately 4 hours at 1065° F. The maximum pressure attained during this portion of the reaction was 840 p.s.i.g. The reactor was then vented and the temperature was brought back to room conditions. The percent conversion to polymer soluble in bromobenzene was 17.8%. The inherent viscosity in benzene was 0.084.

The linear absorbance specrta of this example was also measured in accordance with the procedure described in Example III. The density of the pellet was 22.9472 g./l. The planimeter integrated peak areas and the weight percent of the various characteristic structures are shown in Table VII. The percent recovery for this linear absorbance spectra was 109.8%.

TABLE VII

| Region | Planimeter area | $A/b$, cm.$^{-1}$ | $c$, g./l. | Weight, percent |
|---|---|---|---|---|
| I | 118 | 185.7–1114.9 [1] | 4.54 | 18.0 |
| P | 176 | 277.0 | 8.32 | 33 |
| M | 135 | 212.5 | 6.38 | 25.3 |
| PH | 297 | 276.4 | 5.98 | 23.7 |

[1] Corrected.

Example VIII

Into a stirred 300 ml. autoclave there was charged 16 g. of a catalyst supported on $SiO_2 \cdot Al_2O_3$ along with 50 g. of benzene and 50 p.s.i.g. of hydrogen. A maximum pressure of 1040 p.s.i.g. and a maximum temperature of 1058° F. was reached during a seven-hour reaction period. The percent conversion to soluble polymer was 5%. The polymer had an inherent viscosity of 0.025 when measured in trichlorobenzene at 135° C.

Example IX

Into a stirred 300 ml. autoclave there was charged 2.0 g. of the catalyst of Example I along with 47.5 g. of toluene and 2.5 g. of phenylcyclohexane. The initial hydrogen charge was 200 p.s.i.g. The reaction time was 6 hours, the total pressure was 1600 p.s.i.g. and the maximum temperature was 1050° F. The percent conversion to polymer soluble in benzene and insoluble in pentane was about 6%.

What is claimed is:

1. Branched polyphenylenes comprising benzene ring structures bonded into a polymer chain wherein the amount of benzene ring structures bonded to three or more other benzene ring structures is from 15 to 25 percent by weight, the amount of benzene ring structures bonded to two other benzene ring structures is from 45 to 65 percent by weight, and the amount of benzene ring structures bonded through the meta position to two other benzene ring structures is from 15 to 30 percent by weight, with the remaining benzene ring structures being bonded to only one other benzene ring structure.

2. The polyphenylenes of claim 1 wherein the amount of benzene ring structures bonded to three or more other benzene ring structures is from 17 to 22 percent by weight.

3. The polyphenylenes of claim 1 wherein the amount of benzene ring structures bonded to two other benzene ring structures is from 50 to 60 percent by weight.

4. The polyphenylenes of claim 1 wherein the amount of benzene ring structures bonded through the meta position to two other benzene ring structures is from 19 to 28 percent by weight.

5. The polyphenylenes of claim 1 consisting of alkyl-substituted benzene ring structures, said alkyl-substituted benzene ring structures having as substituents from 1 to 3 alkyl groups selected from the alkyl groups constaining from 1 to 3 carbon atoms.

6. The polyphenylenes of claim 5 consisting of methyl-substituted benzene ring structures.

7. The polyphenylenes of claim 1 consisting of a mixture of alkyl-unsubstituted benzene ring structures and alkyl-substituted benzene ring structures, said alkyl-substituted benzene ring structures having as substituents from 1 to 3 alkyl groups selected from the alkyl groups containing from 1 to 3 carbon atoms.

8. The polyphenylenes of claim 7 wherein the alkyl-substituted benzene ring structures have as substituents from 1 to 3 methyl groups.

9. The polyphenylenes of claim 1 consisting of alkyl-unsubstituted benzene ring structures.

10. The polyphenylenes of claim 9 wherein the amount of benzene ring structures bonded to three or more other benzene ring structures is from 17 to 22 percent by weight.

11. The polyphenylenes of claim 9 wherein the amount of benzene ring structures bonded to two other benzene ring structures is from 50 to 60 percent by weight.

12. The polyphenylenes of claim 9 wherein the amount of benzene ring structures bonded through the meta position to two other benzene ring structures is from 19 to 28 percent by weight.

13. The polyphenes of claim 1 wherein the inherent viscosity of the polymer is at least 0.04 when measured in trichlorobenzene at 135° C.

14. The polyphenylenes of claim 13 consisting of alkyl-unsubstituted benzene ring structures.

15. The polyphenylenes of claim 14 wherein the amount of benzene ring structures bonded to three or more other benzene ring structures is from 17 to 22 percent by weight.

16. The polyphenylenes of claim 14 wherein the amount of benzene ring structures bonded to the two other benzene ring structures is from 50 to 60 percent by weight.

17. The polyphenylenes of claim 14 wherein the amount of benzene ring structures bonded through the meta position to two other benzene ring structures is from 19 to 28 percent by weight.

18. The polyphenylenes of claim 14 wherein the inherent viscosity is at least 0.08.

19. The polyphenylenes of claim 14 wherein the inherent viscosity is between 0.11 and 0.17.

20. A branched polyphenylene wherein the linear infrared absorbance spectra integrated peak area within the frequency range 726–930 cm.$^{-1}$ is distributed as follows: From 13 to 18% of the integrated peak area is within the frequency range 854–930 cm.$^{-1}$, from 20 to 26% is within the frequency range 806–854 cm.$^{-1}$, from 13 to 20% is within the frequency range 778–806 cm.$^{-1}$, and the remainder of the integrated peak area is within the frequency range 726–778 cm.$^{-1}$.

21. The polyphenylene of claim 20 wherein the inherent viscosity is at least 0.04 when measured in trichlorobenzene at 135° C.

22. The polyphenylene of claim 20 wherein the inherent viscosity is at least 0.08 when measured in trichlorobenzene at 135° C.

References Cited

UNITED STATES PATENTS

| | | | |
|---|---|---|---|
| 3,291,732 | 12/1966 | Spilners et al. | 252—59 |
| 3,265,753 | 8/1966 | Goeb | 260—670 |
| 3,437,695 | 8/1969 | Kruse | 260—668 R |
| 3,535,387 | 10/1970 | Mertwoy et al. | 260—668 R |
| 3,600,445 | 8/1971 | Wirth et al. | 260—668 R |

CURTIS R. DAVIS, Primary Examiner

U.S. Cl. X.R.

260—670

UNITED STATES PATENT OFFICE
CERTIFICATE OF CORRECTION

Patent No. 3,792,099    Dated February 12, 1974

Inventor(s) Wang, Chen-Shen and Wennerberg, Arnold N.

It is certified that error appears in the above-identified patent and that said Letters Patent are hereby corrected as shown below:

Col. 3, line 47 -- H -- should be inserted as follows:

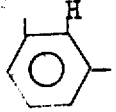

Col. 7, lines 5-7 "The partially hydrogenated benzene ring structure. The partially hydrogenated benzene ring structure." should be deleted.

Col. 7, line 55 -- about -- should be added before "98 weight percent"

Col. 9, line 62 "reuslting" should read -- resulting --.

Col. 11, line 18 In the equation "C" should be -- c --.

Col. 11, Table II The footnote -- 1 -- should be added in the first line of the A/b, Cm.$^{-2}$ column as follows: -- 213.2$^{-1}$ 144.1.

Col. 12, line 11 "atributable" should read -- attributable --.

Col. 12, line 40 "structure" should read -- structures --.

Col. 14, line 27 In Claim 13, "polyphenes" should read -- polyphenylenes --.

Signed and sealed this 23rd day of July 1974.

(SEAL)
Attest:

McCOY M. GIBSON, JR.
Attesting Officer

C. MARSHALL DANN
Commissioner of Patents